(12) United States Patent
Fujii et al.

(10) Patent No.: US 10,473,537 B2
(45) Date of Patent: Nov. 12, 2019

(54) LOAD SENSOR

(71) Applicant: AISIN SEIKI KABUSHIKI KAISHA, Kariya-shi (JP)

(72) Inventors: Hiroyuki Fujii, Kariya (JP); Shintaro Nakaya, Obu (JP)

(73) Assignee: AISIN SEIKI KABUSHIKI KAISHA, Kariya-shi (JP)

(*) Notice: Subject to any disclaimer, the term of this patent is extended or adjusted under 35 U.S.C. 154(b) by 0 days.

(21) Appl. No.: 15/987,088

(22) Filed: May 23, 2018

(65) Prior Publication Data

US 2018/0340849 A1  Nov. 29, 2018

(30) Foreign Application Priority Data

May 29, 2017 (JP) .................................. 2017-105729
May 29, 2017 (JP) .................................. 2017-105730
May 31, 2017 (JP) .................................. 2017-107706

(51) Int. Cl.
  *G01L 1/26* (2006.01)
  *G01G 19/12* (2006.01)
  *G01L 1/22* (2006.01)

(52) U.S. Cl.
  CPC ............ *G01L 1/2231* (2013.01); *G01G 19/12* (2013.01); *G01L 1/2206* (2013.01); *G01L 1/26* (2013.01)

(58) Field of Classification Search
  CPC .................................. G01L 1/26; G01G 19/12
  See application file for complete search history.

(56) References Cited

U.S. PATENT DOCUMENTS

| 6,323,443 | B1 | 11/2001 | Aoki et al. | |
|---|---|---|---|---|
| 7,762,150 | B2* | 7/2010 | Kawabata | B60N 2/002 177/144 |
| 2003/0106723 | A1* | 6/2003 | Thakur | G01G 19/4142 177/144 |
| 2004/0124018 | A1* | 7/2004 | Yanagi | B60N 2/002 177/144 |
| 2004/0187609 | A1* | 9/2004 | Nishio | G01G 19/4142 73/862.474 |

(Continued)

FOREIGN PATENT DOCUMENTS

| JP | 2006-234419 | 9/2006 |
|---|---|---|
| JP | 2008-2999 | 1/2008 |

(Continued)

OTHER PUBLICATIONS

Extended European Search Report dated Nov. 6, 2018 in Patent Application No. 18173117.5, 7 pages.

*Primary Examiner* — Lisa M Caputo
*Assistant Examiner* — Jamel E Williams
(74) *Attorney, Agent, or Firm* — Oblon, McClelland, Maier & Neustadt, L.L.P.

(57) ABSTRACT

A load sensor disposed between a first member and a second member to detect a load applied to the first member in an up-down direction, the load sensor includes a strain body including a strain gauge, a first fixation member fixing the strain body and the first member to each other, a second fixation member fixing the strain body and the second member to each other, and a restriction portion restricting a displacement of the strain body in a state where the first member is displaced upward by a predetermined distance relative to the second member based on the upward load applied to the first member.

3 Claims, 3 Drawing Sheets

(56) References Cited

U.S. PATENT DOCUMENTS

2015/0047439 A1* 2/2015 Ogawa .................. G01L 1/26
73/862.621

FOREIGN PATENT DOCUMENTS

| JP | 2008002999 A * | 1/2008 | ............. B60N 2/002 |
| JP | 2009-128106 | 6/2009 | |
| JP | 2011-21968 | 2/2011 | |
| JP | 2011-218881 | 11/2011 | |

* cited by examiner

Width direction

LOAD SENSOR

CROSS REFERENCE TO RELATED APPLICATIONS

This application is based on and claims priority under 35 U.S.C. § 119 to Japanese Patent Application 2017-105729, filed on May 29, 2017, Japanese Patent Application 2017-107706, filed on May 31, 2017 and Japanese Patent Application 2017-105730, filed on May 29, 2017, the entire contents of which are incorporated herein by reference.

TECHNICAL FIELD

This disclosure generally relates to a load sensor.

BACKGROUND DISCUSSION

A known load sensor is disclosed, for example, in JP2009-128106A which is hereinafter referred to as Reference 1. The load sensor disclosed in Reference 1 includes a strain body to which a strain gauge is attached. A center portion of the strain body is fixed to a first member (a frame). Opposed end portions of the strain body are fixed to a second member (an upper rail). In a case where a load in an up-down direction is applied to the first member, the strain gauge is configured to be elastically deformed. The load sensor electrically detects the aforementioned load based on changes in electric resistance of the strain gauge which occurs in association with the elastic deformation of the strain body.

According to Reference 1, in a case where a large load in the up-down direction is applied to the first member at a time of vehicle collision, for example, the strain body may be plastically deformed beyond its elastic limit. In this case, the strain body is unable to return to its original form, which may lead to deterioration of load detection accuracy.

A need thus exists for a load sensor which is not susceptible to the drawback mentioned above.

SUMMARY

According to an aspect of this disclosure, a load sensor disposed between a first member and a second member to detect a load applied to the first member in an up-down direction, the load sensor includes a strain body including a strain gauge, a first fixation member fixing the strain body and the first member to each other, a second fixation member fixing the strain body and the second member to each other, and a restriction portion restricting a displacement of the strain body in a state where the first member is displaced upward by a predetermined distance relative to the second member based on the upward load applied to the first member.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
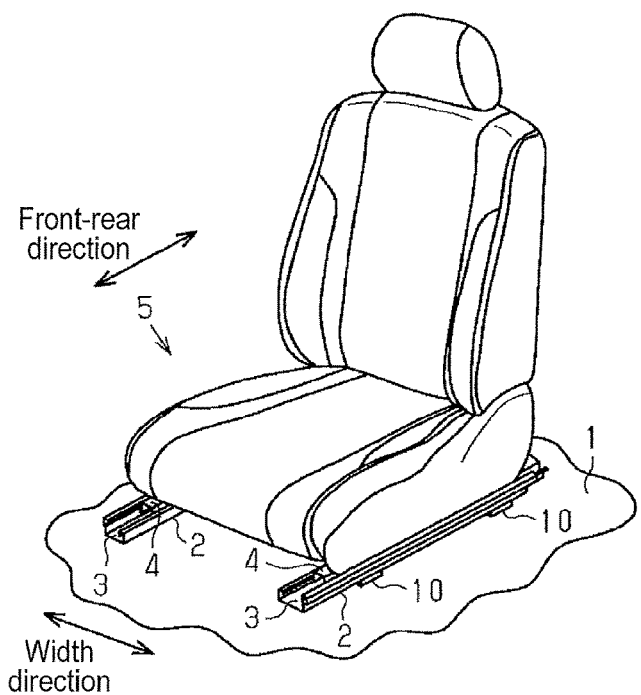
FIG. 1 is a perspective view of a seat where a load sensor according to embodiments disclosed here is applied.

A first embodiment of a load sensor is explained below. In the following explanation, a front-rear direction corresponds to a front-rear direction of a vehicle. As illustrated in FIG. 1, lower rails 2 serving as a pair of first members arranged adjacent to each other in a width direction of the vehicle are supported at a floor 1 of the vehicle in a state extending in the front-rear direction. The floor 1 serves as a second member. Upper rails 4 are connected to the respective lower rails 2 so as to be movable in the front-rear direction. A seat 5 constituting a seating portion for an occupant is supported at the upper rails 4.

Each of the lower rails 2 includes a bottom wall 3 which extends in the front-rear direction substantially in an elongated form. A pair of load sensors 10 is arranged between the floor 1 and the bottom wall 3 of the lower rail 2 so as to be adjacent to each other in the front-rear direction. Each of the load sensors 10 detects a load applied to the lower rail 2 in the up-down direction, i.e., a load of an occupant seated in the seat 5, for example. Specifically, the bottom wall 3 (the lower rail 2) is fixed and supported at the floor 1 via the load sensors 10 provided at front and rear end portions of the bottom wall 3.

Figure 2:
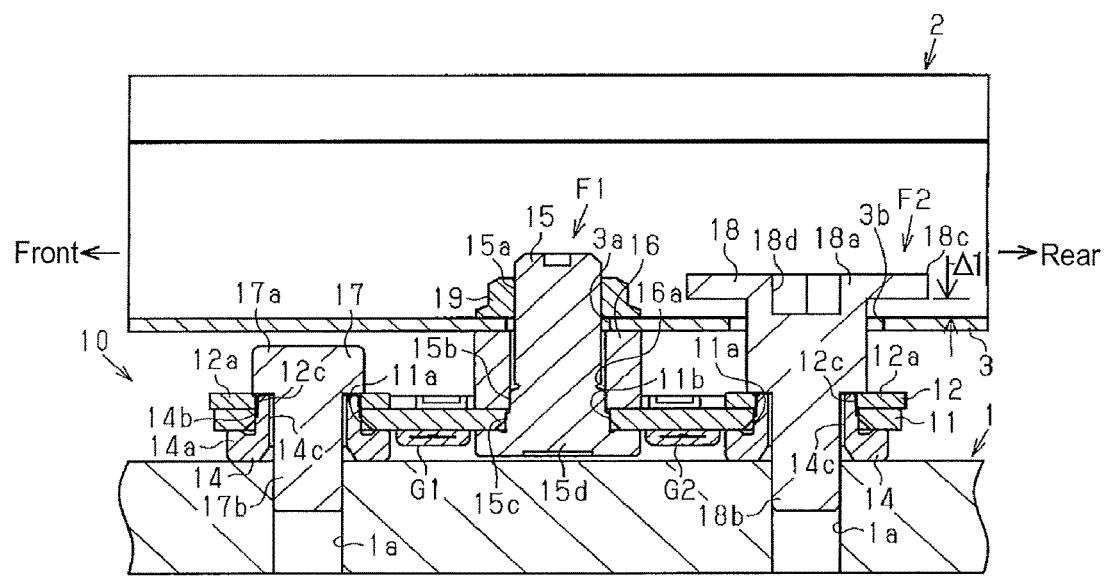
FIG. 2 is a cross-sectional view illustrating a construction of the load sensor according to a first embodiment disclosed here.
Figure 3:
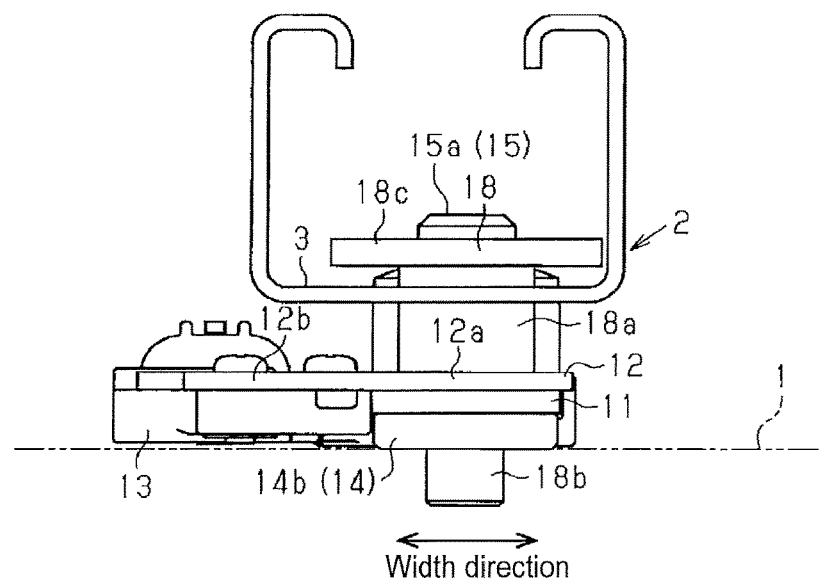
FIG. 3 is a front view illustrating the construction of the load sensor according to the first embodiment.

As illustrated in FIGS. 2 and 3, a pair of screw bores 1a serving as front and rear screw bores 1a is provided at the floor 1 so as to be positioned adjacent to each other in the front-rear direction. Each of the screw bores 1a extends in the up-down direction while facing the load sensor 10 and the bottom wall 3. In addition, a rail connection bore 3a in a substantially circular form is provided at the bottom wall 3 of the lower rail 2. The rail connection bore 3a opens in the up-down direction while facing the load sensor 10 at a center portion between the screw bores 1a adjacent to each other in the front-rear direction. Further, an insertion bore 3b in a substantially circular form is provided at the bottom wall 3 of the lower rail 2. The insertion bore 3b opens in the up-down direction in a state being substantially coaxial with the rear screw bore 1a. An inner diameter of the insertion bore 3b is specified greater than an inner diameter of the rear screw bore 1a.

The load sensor 10 includes a strain body 11 which extends in the front-rear direction in a substantially elongated form while bridging over the screw bores 1a at a position where the strain body 11 is sandwiched between the floor 1 and the bottom wall 3 in the up-down direction. The strain body 11 includes a pair of fixation holes 11a in a substantially circular form arranged at opposed end portions of the strain body 11, the fixation holes 11a being substantially coaxial with the respective screw bores 1a. The strain body 11 also includes a center hole 11b in a substantially circular form arranged at a center portion of the strain body 11 in a state where the center hole 11b is coaxial with the rail connection bore 3a. The stain body 11 includes a pair of strain gauges G1 and G2 attached to a lower surface of the stain body 11. Specifically, as illustrated in FIG. 2, the strain gauge G1 is attached to the lower surface between one of the fixation holes 11a and the center hole 11b adjacent to each other while the strain gauge G2 is attached to the lower surface between the other of the fixation holes 11a and the center hole 11b adjacent to each other.

The load sensor 10 also includes a bracket 12 made of metallic plate, for example, placed onto the strain body 11. The bracket 12 integrally includes a pair of mounting portions 12a in a substantially annular form and an amplifier case mounting portion 12b. The pair of mounting portions 12a is provided adjacent to each other in the front-rear direction and is substantially coaxial with the respective fixation holes 11a of the strain body 11. The amplifier case mounting portion 12b connects the respective mounting portions 12a each other in the front-rear direction while bypassing or not disturbing the strain body 11. The mounting portions 12a include respective press-fit bores 12c which are substantially coaxial with the respective fixation holes 11a and each of which includes an inner diameter substantially equal to an inner diameter of each of the fixation holes 11a.

An amplifier case 13 is attached to a lower surface of the amplifier case mounting portion 12b in a state being adjacent to the strain body 11 in the width direction of the vehicle. The amplifier case 13 houses an amplifier board for amplifying a signal from the strain gauge G1 or G2, for example.

The load sensor 10 includes a pair of lower bushes 14 adjacent to each other in the front-rear direction and substantially coaxial with the respective fixation holes 11a. Each of the lower bushes 14 is formed in a stepped cylindrical form. The lower bush 14 integrally includes a base portion 14a positioned onto the floor 1 and a mounting portion 14b protruding upward from the base portion 14a with a reduced diameter than the base portion 14a. An outer diameter of the mounting portion 14b is specified to be substantially equal to the inner diameter of the fixation hole 11a, for example. The strain body 11 is placed onto the base portions 14a of the respective lower bushes 14 in a state where the mounting portions 14b thereof are inserted to be positioned within the respective fixation holes 11a in a press-contact manner. The bracket 12 is placed onto the strain body 11 in a state where the mounting portions 14b are inserted to be positioned within the respective press-fit bores 12c in a press-contact manner. The lower bushes 14 are thus fixed to the strain body 11, for example. Dimensions in the up-down direction obtained in a state where the strain body 11 and the bracket 12 overlap each other (i.e., a plate thickness of a combination of the strain body 11 and the bracket 12) is specified to be substantially equal to dimensions of the mounting portion 14b in the up-down direction (i.e., in an axial direction). Thus, an upper surface of the bracket 12 is connected to upper surfaces of the mounting portions 14b in a state being substantially coplanar therewith. A center portion of each of the lower bushes 14 constitutes an insertion bore 14c which has a slightly greater inner diameter than an inner diameter of the screw bore 1a.

The load sensor 10 further includes a fixture 15 which is substantially coaxial with the center hole 11b. The fixture 15 integrally includes a screw portion 15a, a press-fit portion 15b, an insertion portion 15c and a head portion 15d. The press-fit portion 15b, the insertion portion 15c and the head portion 15d, each of which is formed in a substantially disc form, are connected to a lower end of the screw portion 15a and includes diameters which sequentially increase in the mentioned order relative to the screw portion 15a. An outer diameter of the insertion portion 15c is specified slightly smaller than an inner diameter of the center hole 11b. Dimensions of the insertion portion 15c in the up-down direction (axial direction) are specified substantially equal to dimensions of the strain body 11 in the up-down direction (a plate thickness of the strain body 11). In the fixture 15, the screw portion 15a is inserted into the center hole 11b from a lower side so that an upper surface of the head portion 15d makes contact with a peripheral edge portion of the center hole 11b and the insertion portion 15c is inserted to be positioned within the center hole 11b. At this time, an upper surface of the strain body 11 is connected to an upper surface of the insertion portion 15c in a state being coplanar therewith.

The load sensor 10 further includes a ring member 16 in a substantially annular form, the ring member 16 including a mounting bore 16a which includes an inner diameter substantially equal to an outer diameter of the press-fit portion 15b. The ring member 16 is fixed, together with the fixture 15, to the strain body 11 in a state where the press-fit portion 15b protruding upward relative to the center hole 11b is inserted to be positioned within the ring member 16 in a press-contact manner. At this time, a lower surface of the ring member 16 makes contact with the peripheral edge portion of the center hole 11b and a peripheral edge portion of the insertion portion 15c. Dimensions of the ring member 16 in the up-down direction (i.e., the axial direction) are specified sufficiently greater than dimensions of the bracket 12 in the up-down direction (i.e., a plate thickness of the bracket 12).

A front end portion of the strain body 11, for example, is fixed to the floor 1 by means of a fastening bolt 17. The fastening bolt 17 includes a head portion 17a substantially coaxial with the fixation hole 11a, for example, and a screw portion 17b provided to protrude at a lower side of the head portion 17a in a state where the screw portion 17b is substantially coaxial with the head portion 17a. The head portion 17a includes a substantially polygonal (for example, hexagonal) columnar form with width across flats greater than the inner diameter of the fixation hole 11a, for example. The screw portion 17b of the fastening bolt 17 is inserted to be positioned within the insertion bore 14c. A lower end portion of the screw portion 17b extending through the insertion bore 14c is tightened to the screw bore 1a. As a result, the front end portion of the strain body 11, for example, disposed and sandwiched between the floor 1 and the head portion 17a is fixed to the floor 1.

On the other hand, a rear end portion of the strain body 11, for example, is fixed to the floor 1 by means of a stopper bolt 18 serving as a fastening member. The stopper bolt 18 integrally includes a head portion 18a, a screw portion 18b and a flange 18c. The screw portion 18b serves as a shaft portion and the flange 18c serves as a restriction portion. The head portion 18a is substantially coaxial with the fixation hole 11a, for example, and includes an outer diameter greater than the inner diameter of the fixation hole 11a, for example. The screw portion 18b is provided to protrude at a lower side of the head portion 18a in a state being substantially coaxial with the head portion 18a. The flange 18c is configured in a substantially annular form protruding outward at an upper end portion of the head portion 18a. Dimensions of the head portion 18a in the up-down direction (in the axial direction) are specified greater than a separation distance between the bottom wall 3 and the lower bush 14 in the up-down direction. An outer diameter of the flange 18c is specified greater than the inner diameter of the insertion bore 3b. The head portion 18a includes a hole 18d for insertion of a fastening tool, for example, the hole 18d being formed downward in a substantially polygonal form (for example, hexagonal form). In the stopper bolt 18, the head portion 18a is inserted to be loosely positioned within the insertion bore 3b. In addition, the screw portion 18b is inserted to be positioned within the insertion bore 14c. Further, a lower end portion of the screw portion 18b which penetrates through the insertion bore 14c is tightened by the screw bore 1a. As a result, the rear end portion of the strain body 11, for example, disposed between the floor 1 and the head portion 18a is fixed to the floor 1. The lower bush 14 and the stopper bolt 18 constitute a second fixation member F2 in cooperation with the screw bore 1a.

The center portion of the strain body 11 is fixed to the bottom wall 3 of the lower rail 2 by a fixation nut 19. The fixation nut 19 is tightened from an upper side to an upper end portion of the screw portion 15a which extends through the rail connection bore 3a to thereby sandwich, together with the head portion 15d, the center portion of the strain body 11, for example, in a state where an upper surface of the ring member 16 is in contact with a lower surface of the bottom wall 3. Accordingly, the center portion of the strain body 11 which is sandwiched, together with the ring member 16, between the head portion 15d and the fixation nut 19 is fixed to the bottom wall 3. The fixture 15, the ring member 16 and the fixation nut 19 constitute a first fixation member F1.

A separation distance between the bottom wall 3 and the strain body 11 in the up-down direction is determined by the ring member 16 disposed between the bottom wall 3 and the strain body 11. In the same manner, a separation distance between the floor 1 and the strain body 11 in the up-down direction is determined by the base portion 14a disposed between the floor 1 and the strain body 11. The flange 18c of the stopper bolt 18 is arranged at an upper side of the bottom wall 3 with a predetermined clearance $\Delta 1$ therefrom, the separation distance of the bottom wall 3 from the floor 1 in the up-down direction being determined in the aforementioned manner.

With the aforementioned construction, in a case where a load of an occupant seated in the seat 5, for example, is transmitted to the strain body 11 via the first fixation member F1, the strain body 11 is elastically deformed in the up-down direction in response to the aforementioned load, so that an electrical resistance of each of the strain gauges G1 and G2 changes. Changes in voltage which occur in association with changes in electrical resistance of each of the strain gauges G1 and G2 are amplified by the amplifier board housed in the amplifier case 13 to thereby detect the load of the occupant.

According to the first embodiment, in a case where an upward load exceeding an expected load within a normal operation range is applied to the lower rail 2 because the seat 5 is forced or urged to move upward due to a vehicle collision, for example, the lower rail 2 is greatly displaced upward relative to the floor 1 while the strain body 11 is elastically deformed. At this time, when the lower rail 2 (specifically, the bottom wall 3) is displaced upward relative to the floor 1 by a predetermined distance corresponding to the clearance $\Delta 1$ to make contact with the flange 18c, the displacement of the lower rail 2 is restricted by the flange 18c to thereby restrain further elastic deformation of the strain body 11. The clearance $\Delta 1$ is specified on a basis of an amount of elastic deformation of the strain body 11 not exceeding its elastic limit. Thus, the strain body 11 is restrained from being plastically deformed beyond its elastic limit. Further, high strength of the load sensor 10 may be achieved.

In the aforementioned embodiment, the stopper bolt 18 integrally includes the flange 18c. That is, the stopper bolt 18 including a function to fix the strain body 11 to the floor 1 also includes a function to restrain the elastic deformation of the strain body 11 so as to restrain an increase of the number of components.

In the aforementioned embodiment, the load sensor 10 is provided in a unitized manner except for the fastening bolt 17, a part of the first fixation member F1 (specifically, the fixation nut 19) and a part of the second fixation member F2 (specifically, the stopper bolt 18) even before the load sensor 10 is fixed to the floor 1, for example. Thus, an assembly hour for assembling the load sensor 10 on the floor 1, for example, may be reduced.

In the aforementioned embodiment, the load sensor 10 is disposed between the floor 1 and the lower rail 2 to thereby detect the load applied to the seat 5. The aforementioned embodiment may be modified as follows.

In the aforementioned embodiment, the flange 18c of the stopper bolt 18 may be formed in a substantially polygonal annular form or constituted by plural blades or vanes arranged at equal angular intervals, for example.

In the aforementioned embodiment, the head portion 18a of the stopper bolt 18 may be formed in a substantially polygonal (for example, hexagonal) column form. In this case, the hole 18d may be omitted. The fixture 15 may be fixed to the bottom wall 3 by riveting, instead of using the fixation nut 19.

In the aforementioned embodiment, the insertion portion 15c of the fixture 15 may be inserted to be positioned within the center hole 11b in a press-contact state. The fixture 15 may be integrally formed with the strain body 11.

In the aforementioned embodiment, the press-fit portion 15b and the mounting bore 16a may be formed with an externally threaded portion and an internally threaded portion respectively so that the press-fit portion 15b and the mounting bore 16a are meshed with each other. The ring member 16 may be formed in a substantially polygonal annular form.

In the aforementioned embodiment, the mounting portion 14b of the lower bush 14 may be inserted to be positioned within the fixation hole 11a without the press-contact. The lower bush 14 may be integrally formed with the strain body 11.

In the aforementioned embodiment, the lower bush 14 may be omitted as long as the elastic deformation of the strain body 11 is allowable relative to the floor 1 in the up-down direction. A separation distance between the bottom wall 3 and the strain body 11 in the up-down direction may be determined on a basis of a combination of a ring member which is based on the ring member 16 and a washer overlapping the ring member.

In the aforementioned embodiment, the front end portion of the strain body 11, for example, may be fixed to the floor 1 by a stopper bolt which is based on the stopper bolt 18. The front end portion of the strain body 11, for example, may not be fixed to the floor 1. That is, the load sensor 10 may be fixed in a cantilever support manner at the rear end portion of the strain body 11, for example.

In the aforementioned embodiment, the load sensor 10 may be disposed between the upper rail 4 and the seat 5. The load sensor 10 may be disposed between a floor and a bed member so as to detect a load applied to the bed member.

A second embodiment of the load sensor is explained with reference to the attached drawings. For an easy explanation, components or constructions substantially the same as the first embodiment bear the same reference numerals and explanation thereof may be omitted.

Figure 4:
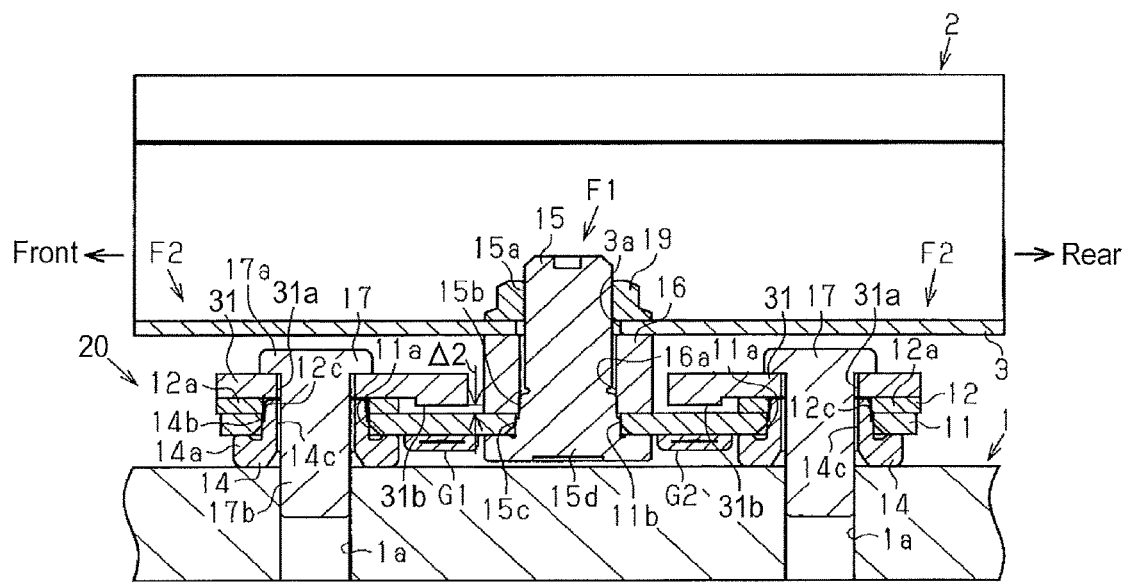
FIG. 4 is a cross-sectional view illustrating a construction of a load sensor according to a second embodiment disclosed here.

As illustrated in FIG. 4, a load sensor 20 according to the second embodiment includes a pair of stopper members 31 provided adjacent to each other in the front-rear direction and each serving as the restriction portion. The stopper members 31 are placed onto the respective mounting portions 12a of the bracket 12 and are made of metallic plate in a substantially square form, for example. The stopper members 31 include insertion bores 31a respectively which are substantially coaxial with the respective fixation holes 11a and each of which is formed in a substantially circular form. An inner diameter of the insertion bore 31a is specified substantially equal to the inner diameter of the insertion bore 14c. Therefore, a peripheral edge portion of the insertion bore 31a is in contact with upper surfaces of the mounting portions 12a and 14b. Each of the stopper members 31 includes a stopper piece 31b protruding downward to the strain body 11 and including a substantially square cross-section. The stopper piece 31b is provided at an edge portion closer to the center hole 11b. A predetermined clearance Δ2 is specified in the up-down direction between a lower surface of the stopper piece 31b and the upper surface of the strain body 11.

End portions of the strain body 11, for example, are fixed to the floor 1 by means of the fastening bolts 17 serving as the fastening members. Each of the fastening bolts 17 includes the head portion 17a substantially coaxial with the fixation hole 11a, for example, and the screw portion 17b provided to protrude at a lower side of the head portion 17a in a state where the screw portion 17b is substantially coaxial with the head portion 17a. The head portion 17a includes a substantially polygonal (for example, hexagonal) columnar form with width across flats greater than the inner diameter of the fixation hole 11a, for example. The screw portion 17b of the fastening bolt 17 is sequentially inserted to be positioned within the insertion bores 31a and 14c. A lower end portion of the screw portion 17b extending through the insertion bore 14c is tightened to the screw bore 1a. As a result, the end portions of the strain body 11, for example, disposed and sandwiched between the floor 1 and the head portions 17a are fixed to the floor 1. That is, each of the stopper members 31 is fixed to the floor 1 in a state being sandwiched, together with the strain body 11, for example, between the floor 1 and the head portion 17a. The lower bush 14 serving as a bush and the fastening bolt 17 constitute the second fixation member F2 in cooperation with the screw bore 1a.

According to the second embodiment, in a case where the strain body 11 is elastically deformed upward by the predetermined distance corresponding to the clearance Δ2 to make contact with the stopper member 31 (specifically, the stopper piece 31b) serving as the restriction portion, further elastic deformation of the strain body 11 is restrained. The clearance Δ2 is specified on a basis of an amount of elastic deformation of the strain body 11 not exceeding its elastic limit. In addition, the stopper member 31 includes sufficient rigidity so as not to be plastically deformed in a case of restraining the elastic deformation of the strain body 11. Thus, the strain body 11 is restrained from being plastically deformed beyond its elastic limit. Further, high strength of the load sensor 20 may be achieved.

In the second embodiment, a downward protruding amount of the stopper piece 31b is changed so as to easily change the clearance Δ2 between the stopper piece 31b and the upper surface of the strain body 11. Accordingly, an upward load applied to the lower rail 2 upon start of restraining the elastic deformation of the strain body 11 may be easily changed.

In the second embodiment, the strain body 11 makes direct contact with the stopper member 31 so as to restrain excess elastic deformation (i.e., inhibit excess plastic deformation) of the strain body 11. Thus, as compared to a case where an appropriate portion other than the strain body 11 makes contact with the stopper member 31, for example, the elastic deformation of the strain body 11 may be accurately and securely started to be restrained. Further, because accumulation of errors does not exist in the clearance Δ2, the clearance Δ2 may be further accurately specified and controlled depending on specification request, for example.

A third embodiment of the load sensor is explained with reference to the attached drawings. For an easy explanation, components or constructions substantially the same as the first and second embodiments bear the same reference numerals and explanation thereof may be omitted.

Figure 5:
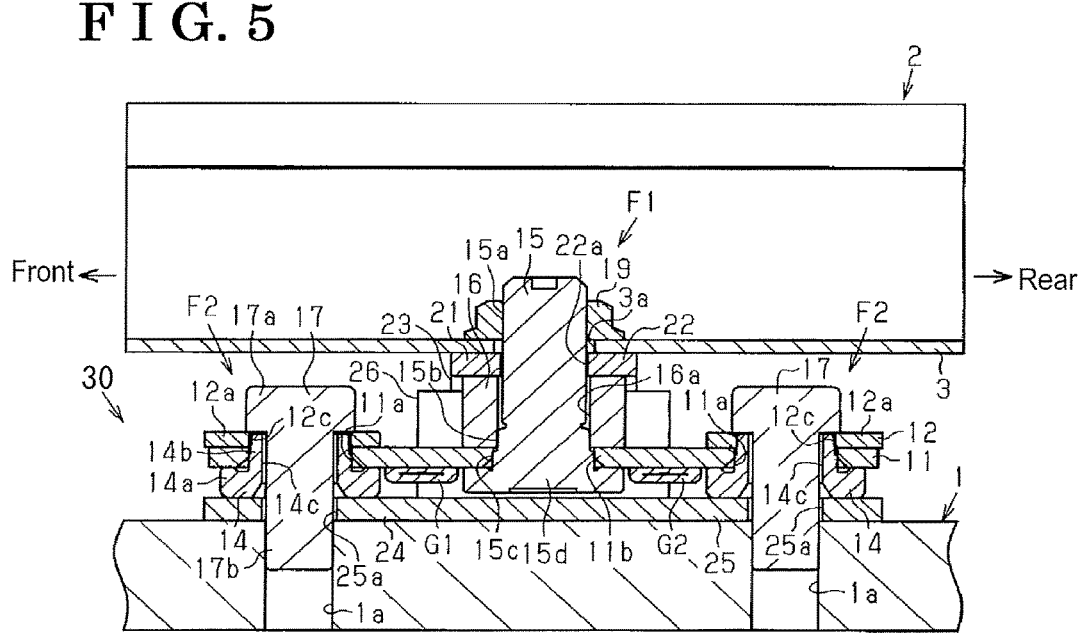
FIG. 5 is a cross-sectional view illustrating a construction of a load sensor according to a third embodiment disclosed here.

As illustrated in FIG. 5, a load sensor 30 according to the third embodiment includes a second restriction member 24 serving as the restriction portion. The second restriction member 24 is placed onto the floor 1 and made of metallic plate, for example. The second restriction member 24 integrally includes a second base portion 25 and a second folding-back portion 26. The second base portion 25 extends on the floor 1 in the front-rear direction so as to bridge over the respective screw bores 1a. The second folding-back portion 26 is connected to one end of the second base portion 25 in the width direction of the vehicle, the one end being positioned at a center portion in the front-rear direction (i.e., a right side in FIG. 6 corresponding to an opposite side to the amplifier case 13, for example), so as to extend upward. The second base portion 25 includes a pair of insertion bores 25a adjacent to each other in the front-rear direction and is substantially coaxial with the respective fixation holes 11a. Each of the insertion bores 25a is formed in a substantially circular form. An inner diameter of the insertion bore 25a is specified slightly greater than the inner diameter of the screw bore 1a. The second folding-back portion 26 integrally includes a second longitudinal wall 26a, a second curving wall 26b and a second restriction wall 26c to form a substantially letter J shape. The second longitudinal wall 26a extends upward from the second base portion 25. The second curving wall 26b is connected to an upper end of the second longitudinal wall 26a to extend in the width direction of the vehicle so as to be away from the second base portion 25, the second curving wall 26b protruding upward. The second restriction wall 26c is connected to a lower end of the second curving wall 26b to extend downward.

The load sensor 30 includes the pair of lower bushes 14 (the bushes) adjacent to each other in the front-rear direction and substantially coaxial with the respective insertion bores 25a (and the fixation holes 11a). Each of the lower bushes 14 is formed in a stepped cylindrical form. The lower bush 14 integrally includes the base portion 14a positioned onto the second base portion 25 and connected thereto by welding, for example, and the mounting portion 14b protruding upward from the base portion 14a with a reduced diameter than the base portion 14a. The outer diameter of the mounting portion 14b is specified to be substantially equal to the inner diameter of the fixation hole 11a, for example. The strain body 11 is placed onto the base portions 14a of the respective lower bushes 14 in a state where the mounting portions 14b are inserted to be positioned within the respective fixation holes 11a in a press-contact manner. The bracket 12 is placed onto the strain body 11 in a state where the mounting portions 14b are inserted to be positioned within the respective press-fit bores 12c in a press-contact manner. The lower bushes 14 are thus fixed to the strain body 11, for example. Dimensions in the up-down direction obtained in a state where the strain body 11 and the bracket 12 overlap each other (i.e., a plate thickness of a combination of the strain body 11 and the bracket 12) is specified to be substantially equal to dimensions of the mounting portion 14b in the up-down direction (i.e., in an axial direction). Thus, the upper surface of the bracket 12 is connected to the upper surfaces of the mounting portions 14b in a state being substantially coplanar therewith. The center portion of each of the lower bushes 14 constitutes the insertion bore 14c which has the slightly greater inner diameter than the inner diameter of the screw bore 1a.

The load sensor 30 further includes the ring member 16 in a substantially annular form, the ring member 16 including the mounting bore 16a which includes the inner diameter substantially equal to the outer diameter of the press-fit portion 15b. The ring member 16 is fixed, together with the fixture 15, to the strain body 11 in a state where the press-fit portion 15b protruding upward relative to the center hole 11b is inserted to be positioned within the ring member 16 in a press-contact manner. At this time, the lower surface of the ring member 16 makes contact with the peripheral edge portion of the center hole 11b and the peripheral edge portion of the insertion portion 15c. Dimensions of the ring member 16 in the up-down direction (i.e., the axial direction) are specified sufficiently greater than dimensions of the bracket 12 in the up-down direction (i.e., the plate thickness of the bracket 12). The upper surface of the ring member 16 is positioned upward than the second folding-back portion 26 (specifically, the second curving wall 26b) of the second restriction member 24.

The load sensor 30 includes a first restriction member 21 placed onto the ring member 16 and made of metallic plate, for example. The first restriction member 21 serves as the restriction portion. The first restriction member 21 integrally includes a first base portion 22 and a first folding-back portion 23. The first base portion 22 is placed onto the ring member 16. The first folding-back portion 23 is connected to one end of the first base portion 22 in the width direction of the vehicle (i.e., a right side in FIG. 6 corresponding to the opposite side to the amplifier case 13, for example), so as to extend downward. The first base portion 22 includes a mounting bore 22a which is substantially coaxial with the mounting bore 16a (the center hole 11b). The screw portion 15a protruding upward from the mounting bore 16a is inserted to be positioned within the mounting bore 22a in a press-contact manner. The first folding-back portion 23 integrally includes a first longitudinal wall 23a, a first curving wall 23b and a first restriction wall 23c to form a substantially letter J shape. The first longitudinal wall 23a extends downward from the first base portion 22. The first curving wall 23b is connected to a lower end of the first longitudinal wall 23a to extend in the width direction of the vehicle so as to come closer to the first base portion 22, the first curving wall 23b protruding downward. The first restriction wall 23c is connected to an upper end of the first curving wall 23b to extend upward.

Figure 6:
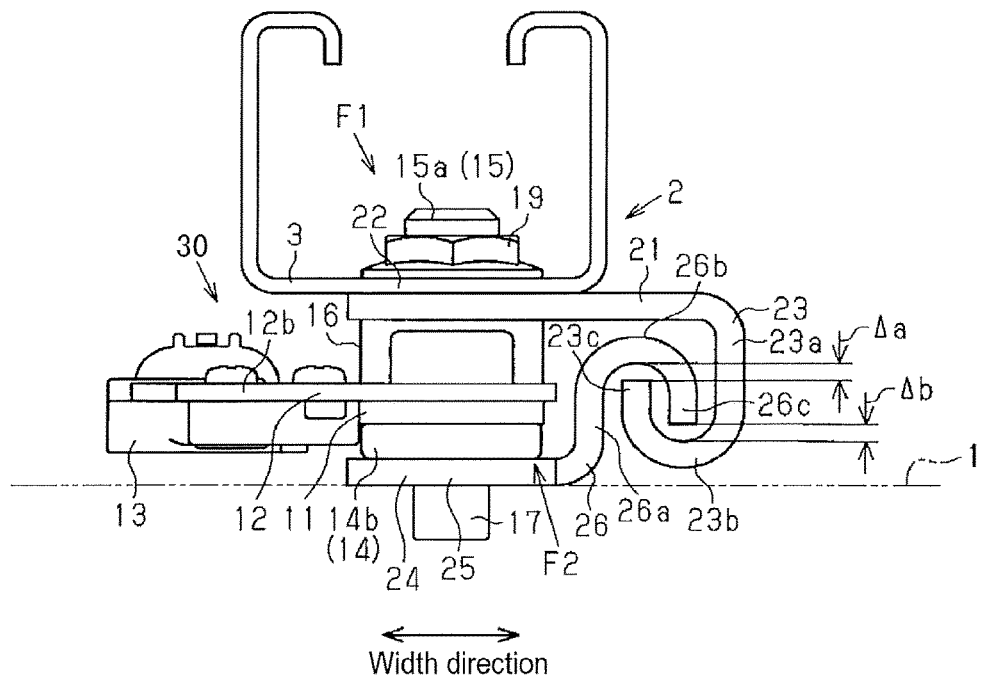
FIG. 6 is a front view illustrating the construction of the load sensor according to the third embodiment.

The first restriction wall 23c is disposed and sandwiched between the second longitudinal wall 26a and the second restriction wall 26c in the width direction of the vehicle. An upper end of the first restriction wall 23c is away downward by a predetermined clearance Δa (the predetermined distance) from the second curving wall 26b as illustrated in FIG. 6. In the same manner, the second restriction wall 26c is disposed and sandwiched between the first longitudinal wall 23a and the first restriction wall 23c in the width direction of the vehicle. A lower end of the second restriction wall 26c is away upward by a predetermined clearance Δb (the predetermined distance) from the first curving wall 23b. The predetermined clearances Δa and Δb are specified substantially the same as each other. Accordingly, the first folding-back portion 23 and the second folding-back portion 26 are positioned or arranged in an alternating manner so as to make contact with each other in a case where a relative position of the first folding-back portion 23 and the second folding-back portion 26 in the up-down direction is displaced by the predetermined clearance Δa or Δb.

End portions of the strain body 11, for example, are fixed to the floor 1 by means of the fastening bolts 17. Each of the fastening bolts 17 includes the head portion 17a substantially coaxial with the fixation hole 11a, for example, and the screw portion 17b provided to protrude at a lower side of the head portion 17a in a state where the screw portion 17b is substantially coaxial with the head portion 17a. The head portion 17a includes a substantially polygonal (for example, hexagonal) columnar form with width across flats greater than the inner diameter of the fixation hole 11a, for example. The screw portion 17b of the fastening bolt 17 is sequentially inserted to be positioned within the insertion bores 31a and 25a. The lower end portion of the screw portion 17b extending through the insertion bore 25a is tightened to the screw bore 1a. As a result, the end portions of the strain body 11, for example, disposed and sandwiched between the floor 1 and the head portion 17a are fixed to the floor 1. The second restriction member 24 which is welded or adhered to the lower bush 14 beforehand is disposed, together with the base portion 14a, between the stain body 11 and the floor 1. The lower bush 14 and the fastening bolt 17 constitute the second fixation member F2 in cooperation with the screw bore 1a.

According to the third embodiment, in a case where the first folding-back portion 23 (the first curving wall 23b and the first restriction wall 23c) is displaced upward relative to the second folding-back portion 26 (the second restriction wall 26c and the second curving wall 26b) by the predetermined clearance Δa or Δb, the first folding-back portion 23 makes contact with the second folding-back portion 26 to thereby restrain further elastic deformation of the strain body 11. Each of the predetermined clearances Δa and Δb is specified on a basis of the amount of elastic deformation of the strain body 11 not exceeding its elastic limit. In addition, each of the first and second restriction members 21 and 24 includes sufficient rigidity so as not to be plastically deformed in a case of restraining the elastic deformation of the strain body 11. Thus, the strain body 11 is restrained from being plastically deformed beyond its elastic limit. Further, high strength of the load sensor 30 may be achieved.

In the third embodiment, the predetermined clearance Δa or Δb may be easily changed by changing a curvature of each of the first and second curving walls 23b and 26b, or dimensions of each of the first and second restriction walls 23c and 26c in the up-down direction, for example. Accordingly, an upward load applied to the lower rail 2 upon start of restraining the elastic deformation of the strain body 11 may be easily changed.

In the third embodiment, in a case where the lower rail 2 is greatly displaced relative to the floor 1, the first curving wall 23b and the second restriction wall 26c make contact with each other at substantially the same time the first restriction wall 23c and the second curving wall 26b make contact with each other. As a result, the elastic deformation of the strain body 11 may be further securely restrained.

According to the first to third embodiments, the load sensor 10, 20, 30 disposed between the lower rail 2 (first member) and the floor 1 (second member) to detect a load applied to the lower rail 2 in the up-down direction, the load sensor 10, 20, 30 includes the strain body 11 including the strain gauge G1, G2, the first fixation member F1 fixing the strain body 11 and the lower rail 2 to each other, the second fixation member F2 fixing the strain body 11 and the floor 1 to each other, and the restriction portion (18c, 31, 24, 21) restricting a displacement of the strain body 11 in a state where the lower rail 2 is displaced upward by the predetermined distance $\Delta 1$, $\Delta 2$, $\Delta a$, $\Delta b$ relative to the floor 1 based on the upward load applied to the floor 1.

Accordingly, in a case where an upward load exceeding an expected load within a normal operation range is applied to the lower rail 2, the lower rail 2 is greatly displaced upward relative to the floor 1 while the strain body 11 is elastically deformed. At this time, when the lower rail 2 is displaced upward relative to the floor 1 by the predetermined distance $\Delta 1$, $\Delta 2$, $\Delta a$, $\Delta b$ to make contact with the restriction portion 18c, 31, 24, 21, the displacement of the lower rail 2 is restricted to thereby restrain further elastic deformation of the strain body 11. Thus, the strain body 11 is restrained from being plastically deformed beyond its elastic limit. The plastic deformation of the strain body 11 is restrained accordingly.

According to the first embodiment, the second fixation member F2 includes the fastening member (stopper bolt) 18 integrally including the head portion 18a which is positioned at an upper side of the strain body 11 to extend through the lower rail 2, the shaft portion (screw portion) 18b which is positioned at a lower side of the head portion 18a to protrude downward, the shaft portion 18b extending through the strain body 11 to be tightened to the floor 1, and the restriction portion (flange) 18c, the fastening member 18 holding the strain body 11 by sandwiching the strain body 11 between the head portion 18a and the floor 1. The restriction portion is the flange 18c provided to protrude at an end portion of the head portion 18a, the end portion extending through the lower rail 2, the flange 18c being contactable with the lower rail 2 in a state where the lower rail 2 is displaced upward by the predetermined distance $\Delta 1$ relative to the floor 1 based on an upward load applied to the lower rail 2.

Accordingly, in a case where the lower rail 2 is displaced upward relative to the floor 1 by the predetermined distance $\Delta 1$ to make contact with the flange 18c, the displacement of the lower rail 2 is restricted to thereby restrain further elastic deformation of the strain body 11. Thus, the strain body 11 is restrained from being plastically deformed beyond its elastic limit.

According to the second embodiment, the restriction portion (stopper member) 31 is mounted at the second fixation member F2 and is arranged in a state where the strain body 11 is contactable with the restriction portion 31 in a direction where the strain body 11 is deformed by a load applied to the lower rail 2 in the up-down direction.

Accordingly, in a case where the lower rail 2 is displaced upward relative to the floor 1 by the predetermined distance $\Delta 2$ so that the strain body 11 makes contact with the restriction portion 31, further elastic deformation of the strain body 11 is restrained. Thus, the strain body 11 is restrained from being plastically deformed beyond its elastic limit.

According to the second embodiment, the second fixation member F2 includes the bush 14 (lower bush) mounted at the strain body 11 and the fastening member 17 (fastening bolt) tightened to the floor 1 in a state where the fastening member 17 and the strain body 11 are together fitted to the bush 14. The restriction portion 31 (stopper member) is mounted at the bush 14.

Accordingly, because the restriction portion 31 is mounted at the bush 14, the restriction portion 31 may be fixed to the strain body 11, for example, even before the strain body 11 is fixed to the floor 1. Thus, in a state before the strain body 11 is fixed to the floor 1, a clearance between the strain body 11 and the restriction portion 31 in the deformation direction of the strain body 11, i.e., an amount of elastic deformation of the strain body 11 when the strain body 11 makes contact with the restriction portion 31 may be adjusted and specified, which may lead to smooth strength control of the load sensor 20.

According to the third embodiment, the restriction portion includes the first restriction member 21 disposed between the strain body 11 and the lower rail 2 and including the first folding-back portion 23 and the second restriction member 24 disposed between the strain body 11 and the floor 1 and including the second folding-back portion 26, the first folding-back portion 23 and the second folding-back portion 26 being positioned in an alternating manner so that the second folding-back portion 26 makes contact with the first folding-back portion 23 in a case where a relative position of the second folding-back portion 26 in the up-down direction relative to the first folding-back portion 23 is displaced by the predetermined distance $\Delta a$, $\Delta b$ by the load applied to the lower rail 2 in the up-down direction.

Accordingly, in a case where an upward load exceeding an expected load within a normal operation range is applied to the lower rail 2, the lower rail 2 is greatly displaced upward relative to the floor 1 while the strain body 11 is elastically deformed. Then, the first restriction member 21 is also greatly displaced in the up-down direction relative to the second restriction member 24. At this time, in a case where the first folding-back portion 23 is displaced relative to the second folding-back portion 26 in the up-down direction by the predetermined distance $\Delta a$, $\Delta b$, the first folding-back portion 23 makes contact with the second folding-back portion 26 to thereby restrain further elastic deformation of the strain body 11. Thus, the strain body 11 is restrained from being plastically deformed beyond its elastic limit.

According to the third embodiment, the first fixation member F1 includes the fixture 15 mounted at the strain body 11 and the nut 19 tightened to an end portion of the fixture 15, the end portion extending through the lower rail 2. The second fixation member F2 includes the bush (lower bush) 14 mounted at the strain body 11 and the bolt 17 tightened to the floor 1 in a state where the bolt 17 and the strain body 11 are together fitted to the bush 14. The first restriction member 21 and the second restriction member 24 are mounted at the fixture 15 and the bush 14 respectively.

Accordingly, because the first restriction portion 21 is mounted at the fixture 15, the first restriction portion 21 may be fixed to the strain body 11, for example, even before the strain body 11 is fixed to the lower rail 2. In addition, because the second restriction portion 24 is mounted at the bush 14, the second restriction portion 24 may be fixed to the strain body 11, for example, even before the strain body 11 is fixed to the floor 1. Therefore, even in a state before the strain body 11 is fixed to the lower rail 2 or the floor 1, the relative position between the first folding-back portion 23 and the second folding-back portion 26 in the up-down direction may be adjusted and specified, which may lead to smooth strength control of the load sensor 30.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A load sensor disposed between a first member and a second member to detect a load applied to the first member in an up-down direction, the load sensor comprising:
    a strain body including a strain gauge;
    a first fixation member fixing the strain body and the first member to each other;
    a second fixation member fixing the strain body and the second member to each other; and
    a restriction portion restricting a displacement of the strain body in a state where the first member is displaced upward by a predetermined distance relative to the second member based on the upward load applied to the first member,
    wherein the restriction portion includes a first restriction member disposed between the strain body and the first member and including a first folding-back portion and a second restriction member disposed between the strain body and the second member and including a second folding-back portion, the first folding-back portion and the second folding-back portion being positioned in an alternating manner so that the second folding-back portion makes contact with the first folding-back portion in a case where a relative position of the second folding-back portion in the up-down direction relative to the first folding-back portion is displaced by the predetermined distance by a load applied to the first member in the up-down direction.

2. The load sensor according to claim 1, wherein
the second fixation member includes a bush mounted at the strain body and a fastening member tightened to the second member in a state where the fastening member and the strain body are together fitted to the bush, and
the restriction portion is mounted at the bush.

3. The load sensor according to claim 1, wherein
the first fixation member includes a fixture mounted at the strain body and a nut tightened to an end portion of the fixture, the end portion extending through the first member,
the second fixation member includes a bush mounted at the strain body and a bolt tightened to the second member in a state where the bolt and the strain body are together fitted to the bush, and
the first restriction member and the second restriction member are mounted at the fixture and the bush respectively.

* * * * *